April 9, 1929.  D. H. GRANT  1,708,295
CORN CUTTER AND LOADER
Filed March 16, 1925
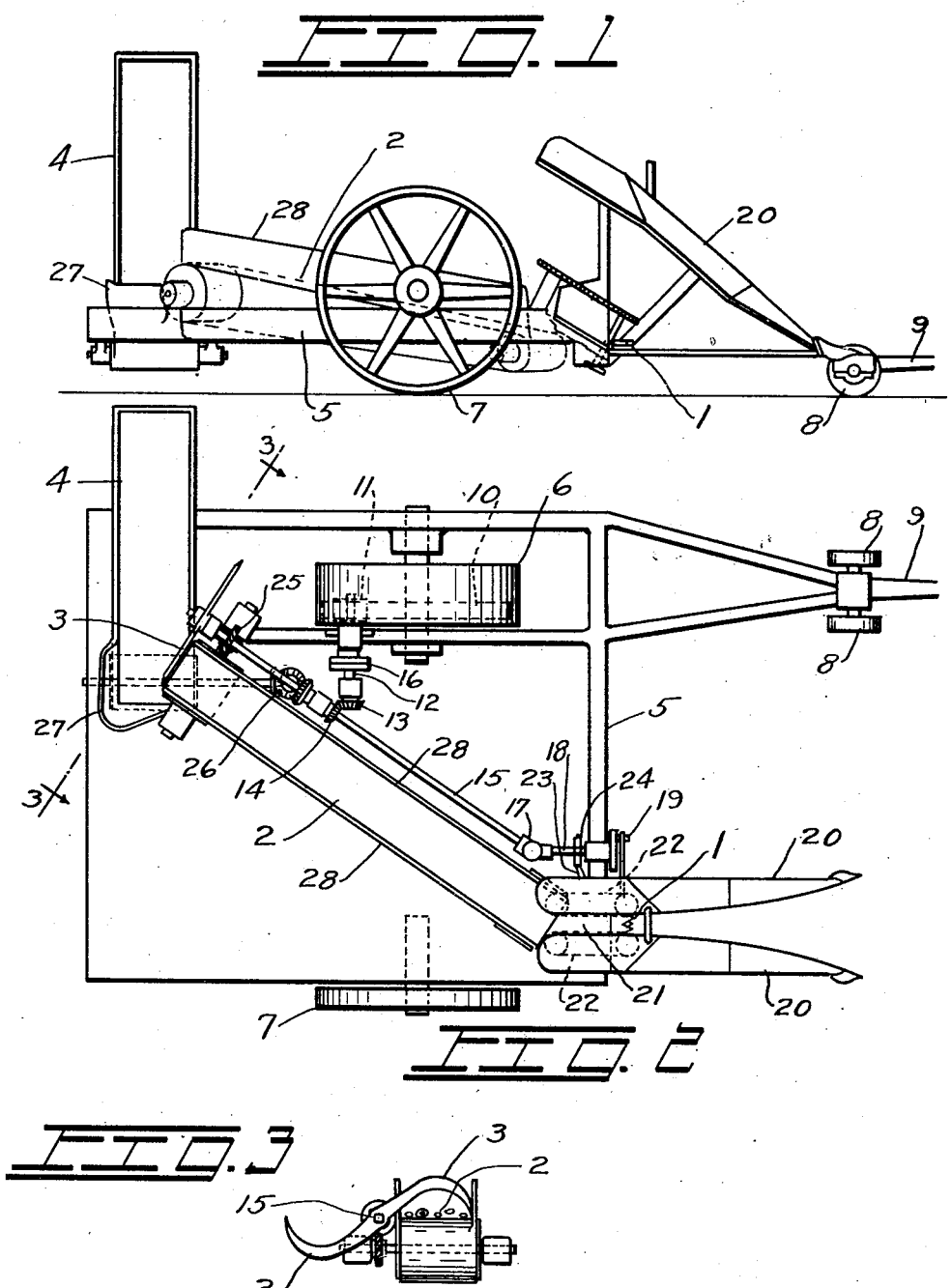
INVENTOR
David H. Grant
BY
Harry Bowen
ATTORNEY Patented Apr. 9, 1929.

1,708,295

UNITED STATES PATENT OFFICE.

DAVID H. GRANT, OF SEATTLE, WASHINGTON.

CORN CUTTER AND LOADER.

Application filed March 16, 1925. Serial No. 15,712.

The invention is a device for cutting and loading corn which will cut the stalk into several large pieces so that it may readily be loaded into a wagon or the like and carried into an ensilage cutter at the silo.

The object of the invention is to provide a device for cutting and loading corn.

Another object of the invention is to provide a device for cutting corn stalks into several pieces as they are cut and loaded.

And a further object of the invention is to provide a corn cutter and loader of a simple and economical construction.

With these ends in view, the invention embodies a device for cutting corn having means for feeding the butt ends toward the rear, means for cutting the stalks into several pieces and means for elevating and dumping the cut pieces.

Other features and advantages of the invention will appear from the following description taken in connection with the drawings, wherein:—

Figure 1 is a side elevation with part broken away.

Figure 2 is a plan view.

Figure 3 is a detail showing the rotary knives for cutting the stalks into several pieces.

In the drawings I have shown my device as it would be constructed wherein numeral 1 indicates the main cutter, numeral 2 the conveyer, for carrying the corn away from the main cutter, numeral 3 the rotary cutter, and numeral 4 the elevating conveyer.

The device is supported upon a frame 5 having wheels 6 and 7 under the central portion of the frame and smaller wheels 8 at the forward end to which a tongue 9 may be connected.

The wheel 6 may be provided with an internal gear 10 as indicated by the dotted lines in Figure 2 which will mesh with a pinion 11 on a shaft 12 and on the opposite end of the shaft 12 is a gear 13 that meshes with a gear 14 on a shaft 15 so that the shaft 15 will rotate as the wheel 6 rotates or as the device is drawn across a surface. The shaft 12 may be provided with a clutch 16 to prevent the mechanism operating except as desired. At one end of the shaft 15 is a universal joint 17 through which a shaft 18 is driven and the shaft 18 is provided with an eccentric 19 which operates the main cutting knives 1 as shown. The cutting knives 1 are provided with guides 20 which hold the upper part of the stalk while the lower ends are forced through the opening 21 by continuous chains 22 which are operated by a belt 23 from a pulley 24 on the shaft 18. The stalks are then fed upon the conveyer 2 with their butts toward the rear, and it will be seen that as they reach the opposite end of the conveyer 2, they will be cut into several pieces by the knives 3.

The knives 3 are mounted upon the end of the shaft 15 and the conveyer 2 is operated by gears 25 from the shaft 15 also, so that the conveyer and knives may be timed to cut the stalks as often as may be desired.

The conveyer 4, which elevates the cut pieces of stalk is also driven from the shaft 15 through the gears 26 and is provided with a hopper 27 at the lower end to feed the stalks to it. It will be observed that the conveyer 4 may be as high as may be desired, or may be arranged at any suitable angle, and may also be driven in any suitable manner.

It will be understood that other changes may be made in the construction without departing from the spirit of the invention. One of which changes may be in the design of the means for first cutting and holding the stalks, another may be in the means for operating the said cutting means, another may be in the use of other means for driving the shaft 18 from the shaft 15, another may be in the means for operating the conveyer 2 and still another may be in the design of the power take off as it is understood this may be arranged in any suitable manner.

The construction will be readily understood from the foregoing description. To use the device, it may be arranged as shown and it will be observed that as the knives 1 are drawn along a row of corn or the like, the corn will be fed upon the conveyer 2 upon which it will be held by guides 28 at the sides, and fed from this conveyer to the knives 3, where it will be cut into pieces. These pieces will then be elevated on the conveyer 4 from where they may be dumped upon a wagon or the like and conveyed to an ensilage cutter or the like at the silo, barn, or any suitable place.

Having thus fully described the invention what I claim as new and desire to secure by Letters Patent, is:—

1. In a harvester of the class described, means for cutting stalks of corn, or the like, means for guiding and conveying the stalks of corn rearwardly and a plurality of rotating hooked shaped cutters crossing the path of the corn to cut the corn into comparatively small pieces.

2. In a corn cutter having stalk cutting and gathering mechanisms, means for transferring the severed stalks rearwardly from the mechanism and a plurality of rotatable cutting elements having their axes parallel to the line of travel of the stalks and extending across the path of the said stalks, said cutting elements comprising hook shaped knives and being adaptable to cut the stalks in several pieces as they pass by, and suitable adjustable supporting means for the said cutter.

3. A harvester comprising stalk gathering and cutting mechanisms, means for transferring the severed stalks rearwardly, two rotatable hooked shaped cutter blades positioned to cut the stalks into several pieces as they pass rearwardly.

DAVID H. GRANT.